United States Patent [19]

Smith

[11] Patent Number: 5,105,730
[45] Date of Patent: Apr. 21, 1992

[54] AIR DISTRIBUTION APPARATUS FOR AN AUTOMOTIVE VEHICLE
[75] Inventor: Calvin G. Smith, Dearborn, Mich.
[73] Assignee: Ford Motor Company, Dearborn, Mich.
[21] Appl. No.: 628,965
[22] Filed: Dec. 17, 1990
[51] Int. Cl.⁵ .............................................. B60H 1/14
[52] U.S. Cl. ................... 454/161; 251/901; 454/145
[58] Field of Search ........... 98/2.08, 2.06, 2.11, 98/2.05, 2; 237/12.3 A, 12.3 B; 251/901

[56] References Cited

U.S. PATENT DOCUMENTS 4,476,773 10/1984 Fehr ....................................... 98/2.08

FOREIGN PATENT DOCUMENTS

476412 11/1975 U.S.S.R. .

Primary Examiner—Albert J. Makay
Assistant Examiner—William C. Doerrler
Attorney, Agent, or Firm—Charles H. Ellerbrock; Roger L. May

[57] ABSTRACT

An air distribution apparatus for an automotive vehicle, comprising a chamber for receiving air conditioned by at least one heat exchanger, the chamber includes an inlet opening and a plurality of discharge openings and mechanism downstream of the inlet opening for selecting at least one of the discharge openings. The mechanism for selecting comprises a pair of rollers, a flexible material disposed between the rollers and having at least one cutout area; and a mechanism for bidirectional driving of the rollers for positioning the flexible material such that the cutout area is either positioned for allowing air flow through at least one of the discharge openings or for preventing air flow through any of the discharge openings.

9 Claims, 3 Drawing Sheets

AIR DISTRIBUTION APPARATUS FOR AN AUTOMOTIVE VEHICLE

BACKGROUND OF THE INVENTION

1. Field of the Invention

The present invention relates to an air distribution apparatus for an automotive vehicle. This apparatus includes a chamber for receiving air which has been conditioned by at least one heat exchanger and a valving mechanism which allows distribution of the conditioned air to normal vehicle outlets in an extremely space efficient manner.

2. Discussion of the Related Art

Automotive vehicle air distribution apparatuses currently employ a means for conditioning the air via a plurality of heat exchangers and prior to ducting the conditioned air to a location in the vehicle which is either selected automatically or by the passenger. The method for ducting the conditioned air is through a plurality of damper doors, each of which is commonly operated by an individual vacuum motor. This type of system commonly includes a damper door and associated motor for the defrost outlet, a damper door and associated motor for the panel outlet and a damper door and associated motor for the floor mode. It is well known in the art that more than one mode of operation, such as panel and floor mode, can be selected at one time.

This prior art system of ducting conditioned air to the vehicle interior requires a large amount of space in order to accommodate the individual damper doors and their associated motors. As packaging requirements for the climate control system of a vehicle become more important, efforts are being directed toward conserving space in all areas of the climate control system. Further, as the cost of manufacturing is always an issue, it is also important to provide an air distribution apparatus which is economical to produce.

One method of providing an air conditioning system for buildings is shown in U.S.S.R. Patent No. 476,412. This reference discloses the use of a temperature regulation screen which is made of an elastic material and is disposed on rollers which synchronically rotate in the same direction. The elastic material is provided with an opening which can be selectively positioned such that it can allow flow through either heat exchanger for selectively allowing purely heating, cooling or some mixture of each with recirculated air. When the opening of the screen is positioned for allowing either heating or cooling, air is sucked through the heat exchanger due to a vacuum created by an air supercharger located downstream of the heat exchangers. The screen is kept in tension by passing over a directing shaft which keeps the screen in contact with the heat exchangers. This patent is not concerned with an air distribution apparatus in an automotive vehicle.

A method for valving flow is shown in Barneby U.S. Pat. No. 3,815,630. Barneby deals with controlling relatively low pressure, large volume fluid flow where the fluids are vapors or gases in a typical absorption system with three absorbers. This system utilizes a curtain valve to throttle a single port or various members of an array of ports, upstream of the port in the direction of fluid flow, so as to seal around the edges of the port under the pressure differential between upstream and downstream sides thereof. This patent is not concerned with an air distribution apparatus in an automotive vehicle and is only concerned with sealing in one plane.

Tragert U.S. Pat. No. 4,084,616 discloses a film fluid proportioning device designed to operate in a linear fashion and has a constant volume output as a function of damper position. It includes a slidable assembly having a sheet of flexible material that is moved against a plate. This flexible material does not have any cutouts and cannot close both ports.

SUMMARY OF THE INVENTION

It is an object of the present invention to provide an air distribution apparatus which is compact and space efficient in its valving of the conditioned air flow.

It is a further object of the invention to provide an air distribution apparatus which is economical to manufacture.

It is still a further object of the present invention to provide an air distribution apparatus with a valving mechanism that can be adapted to assume many different configurations depending on the particular application desired.

It is still a further object of the present invention to provide a system which will accommodate the use of two heater cores that can be independently controlled.

It is still a further object of the present invention which will allow the valving system to be positioned in a variety of positions.

It is still a further object of the present invention to provide a stacked core space efficient air conditioning system.

It is still a further object of the present invention to provide a climate control system for an automotive vehicle which provides desirable stratification of the discharge air from the distribution system.

The above and other objects of the invention are accomplished by air distribution apparatus for an automotive vehicle, comprising means defining a chamber for receiving air conditioned by at least one heat exchanger, the chamber including an inlet opening and a plurality of discharge openings; and means downstream of the inlet opening for selecting at least one of the discharge openings. The means for selecting comprises a pair of rollers, a flexible material disposed between the rollers and having at least one cutout area; and means for bidirectional driving of the rollers for positioning the flexible material such that the cutout area is either positioned for allowing air flow through at least one of the discharge openings or for preventing air flow through any of the discharge openings.

The air conditioning apparatus disclosed is a modular constructed, center-mounted system which is easily adapted to right and left hand steered vehicles. This system can support future styling trends and can also satisfy more rigid customer comfort requirements. The system balances compact package requirements, flexibility of application, airconditioning and heater performance expectations with noise and electrical power consumption limitations.

This air conditioning system is a modular, low pressure drop system designed for high airflow and low noise. It utilizes a straight through airflow path with stacked evaporator and heater cores directly feeding the distribution plenum. This minimizes air flow losses, power consumption and turbulent airflow noise. The system has integral floor and defrost air supply duct. It can also be mated with cross car beams to supply air to outboard registers. Discharge air temperature is controlled via an electronic coolant control valve which regulates engine coolant flow to the heater core to obtain the desired amount of reheat to temper the discharge air.

Air enters the system through a blower assembly. The blower has an integral recirc air/outside air inlet door mechanism that is driven by an actuator mechanism. In the outside air Position, air enters the blower directly from the center cowl area. In the recirculation position, the rotary door is positioned to allow air to be drawn into the blower from the passenger side of the vehicle. The blower is selected to provide uniform inlet air conditions to the evaporator core. Air exiting the blower is evenly distributed, allowing the entire surface of the evaporator core to be fully utilized. The system uses a thin evaporator core which when combined with a large face area will supply air at a uniform discharge temperature with minimal static pressure drop. Approximately 1 inch separates the evaporator from the heater core to allow for condensate drainage and to prevent rehumidification of the air that could occur if airborne condensate carried over into the heater core.

The heater core face area is matched to the evaporator core to minimize losses due to airflow expansion and contraction. This reduces airflow turbulence and related noise. Engine coolant enters the single row heater core at one end of the lower core header tank and exits at the opposite end of the upper tank. This configuration intentionally stratifies the discharge air coming from the heater core in a desirable fashion. Air exiting from the lower portions of the heater core is warmer than air exiting from the top of the core. In panel/floor or defrost/floor modes this automatically provides the warmest air available to be discharged on the passenger's feet via the floor outlets and supplies cooler air to the upper outlets for improved customer comfort.

The discharge air temperature in the blend-door-less system is controlled via an electronic coolant control. The electrically actuated flow control device is mounted in the engine compartment. It is a simple butterfly bypass valve configuration. Engine coolant always flows through the valve and it is only the amount of coolant necessary to obtain the desired discharge air temperature that is diverted to the heater core and then returned to the coolant supply loop.

The air distribution apparatus includes a means for defining a chamber that can receive conditioned air from at least one heat exchanger and also includes a plurality of discharge outlets. This air distribution system includes a compact, space efficient valving mechanism for selecting at least one of the discharge openings from the chamber to send air into. This valving mechanism includes a flexible material disposed between a pair of rollers which is capable of being driven synchronously in each direction. The film includes at least one cutout area which is capable of being positioned for allowing air flow through at least one of the discharge openings or for preventing air flow through any of the openings. It is preferred that the film includes two cutout regions positioned on the film such that when the upper cutout region is exposing the upper half of the top discharge opening, the lower cutout region would expose the lower half of the bottom discharge opening. The motors are also capable of positioning these cutout regions such that a cutout region overlaps either the upper two discharge openings or the lower two discharge openings. There is enough film provided on at least one end of the film to completely cover all of the discharge openings thereby blocking all flow through the air distribution apparatus in this position.

The cutout regions can be one continuous cutout or more preferably can be made up of a plurality of separate cutout areas. This allows the cutout area to be held firmly in place when positioned for discharging air from the chamber. The plurality of cutout areas also prevents localized elongation of the vertical pieces of the film between the plurality of separate cutout areas to evenly distribute the stress that the film is under.

Various means are capable of driving the rollers for moving the flexible film having the cutouts. One mechanism for driving the rollers includes an electric motor operatively connected to at least one roller. It is preferable that each roller includes its own separate bi-directional motor for synchronously driving the flexible film to its desired position. Alternative means for driving the rollers includes a capstan driving mechanism.

It is preferable that the chamber has three discharge outlets or openings for providing air flow to three separate locations in the vehicle. These three separate locations include the defroster ducts, the panel ducts and the floor ducts. It is also contemplated that there may be additional discharge ducts from the chamber for providing for example, a rear a/c or a rear floor duct.

It is also contemplated that three or more cutout regions can be provided on the flexible film for allowing air flow through any or all of the discharge outlet openings. Likewise, it is possible to have additional cutout regions on the film with a variety of possibilities for their position on the film.

DETAILED DESCRIPTION OF THE PREFERRED EMBODIMENTS

Figures 1, 2, 2A:
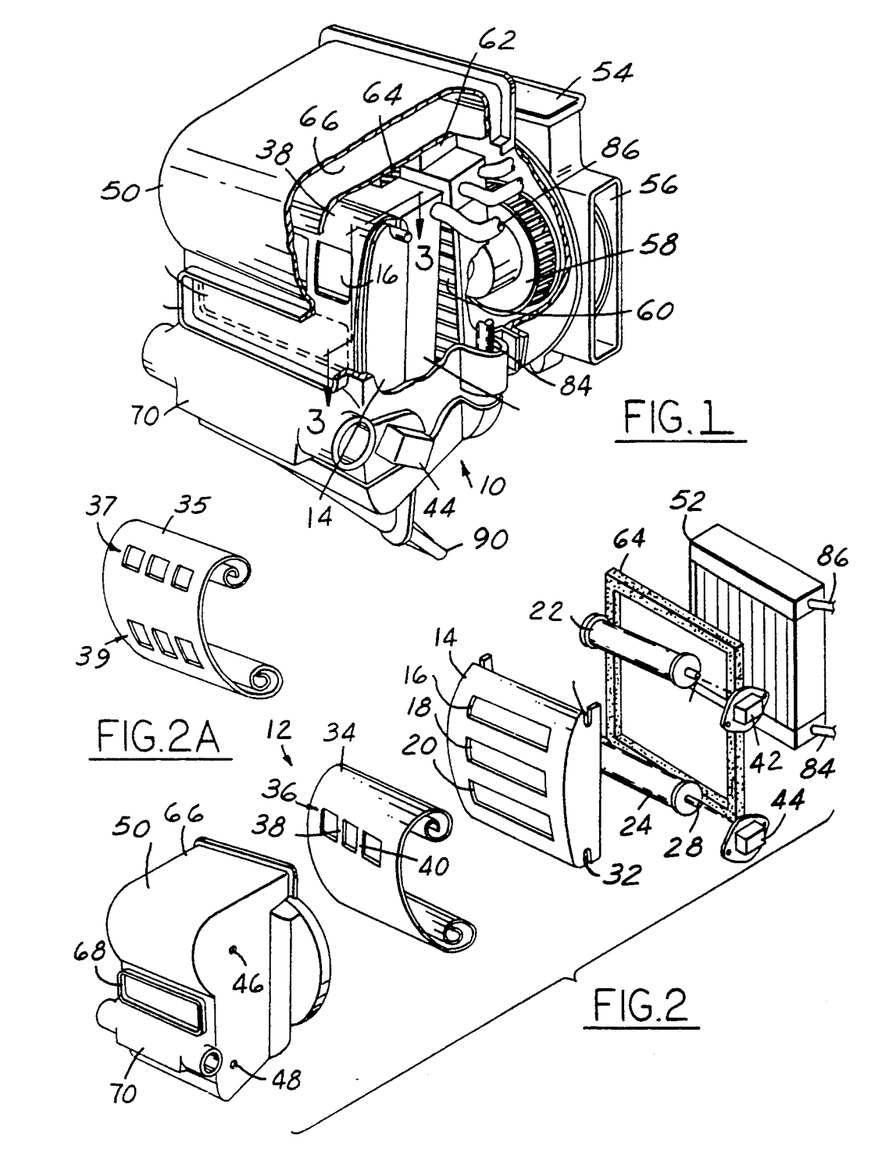
FIG. 1 illustrates a perspective view, partially cut away illustrating the air distribution apparatus of the present invention disposed adjacent the combination of the heater core, the evaporator core and the blower wheel.
FIG. 2 illustrates an exploded view, in perspective, of the air distribution apparatus according to the present invention.
FIG. 2a illustrates a perspective view of another embodiment of the flexible film material shown in FIG. 2 according to a preferred embodiment of the present invention.

FIG. 1 illustrates a heater-a/c system 10 which incorporates the air distribution apparatus 12 according to a preferred embodiment of the present invention. The air distribution apparatus includes a film guide frame 14, as clearly shown in FIG. 2, which has a plurality of discharge openings 16, 18 and 20. The discharge opening 16 is for supplying the defrost ducts, discharge opening 18 is for supplying the panel ducts and discharge opening 20 is for supplying the floor ducts according to a preferred embodiment of the invention. A pair of rollers 22 and 24 are provided with driving shafts 26 and 28.

The rollers 22 and 24 are positioned in the inner frame 14 such that the driving shafts 26 and 28 rest in the recesses 30 and 32 provided in the inner frame 14.

Disposed on the rollers 22 and 24 is a flexible film material 34. The flexible film 34 can be made out of materials such as Mylar ™, polycarbonate or even sail cloth. The flexible film is preferably held in tension between the rollers 22 and 24 and are moved between positions so that this tension is maintained.

The flexible film 34 includes at least one cutout region 36 which can be a continuous cutout of the size corresponding to one of the discharge openings 16, 18 or 20, but preferably includes a plurality of smaller openings separated by thin strips of material 38 and 40. This helps prevent any flapping, curling, necking or rippling of the edges of the cutout region when the cutout region is positioned for discharging flow from one of the discharge openings 16, 18 or 20. While the discharge openings 16, 18, 20 are each shown as one continuous opening for simplicity, it is preferred that each of these openings be a plurality of openings separated by thin strips of material such as is shown in conjunction with the cutout region 36 on film 34. This allows the thin strips of material 38 and 40 to be supported when they are positioned adjacent one of the discharge openings.

FIG. 2a illustrates a preferred flexible film 35 which includes two cutout regions 37 and 39 positioned on the film 35 such that when one of the cutout regions corresponds to the top half of discharge opening 16, the other cutout region would be positioned for allowing flow to the lower half of a discharge opening 20. The cutout regions on the flexible film 34 or 35, the discharge openings 16, 18 and 20 as well as their separating structure of the film guide frame are dimensioned such that it is possible to position a cutout region for feeding through both discharge opening 16 and discharge opening 18 simultaneously. Likewise, it would be possible to discharge simultaneously through discharge opening 18 and discharge opening 20 when the cutout region overlaps those two openings. With two cutout regions in the flexible film 35, sized as described above, it is not possible to allow flow through all three discharge openings simultaneously. It is, however, contemplated that the flexible film could include three cutout regions, one corresponding to each of the discharge openings, and therefore it would be possible to provide air through all three discharge openings simultaneously.

The positioning of the flexible film 34 such that the cutout region 36 corresponds to at least one of the discharge openings 16, 18 or 20 can be accomplished by any bidirectional driving mechanism. It is preferred that the driving mechanism for driving the rollers is a pair of bidirectional motors 42 and 44 which are operatively connected to the driving shafts 26 and 28 of rollers 22 and 24. This connection is made through holes 46 and 48 in an outer duct housing 50. It is contemplated that the motors can be attached directly to the inner frame, either on the inside or on the outside surface. If it is positioned on the outside surface of the inner frame, the outer duct housing 50 would be modified to accommodate the motors. It is also possible to mount the motors such that they are disposed inside the rollers 22 and 24.

Figure 5:
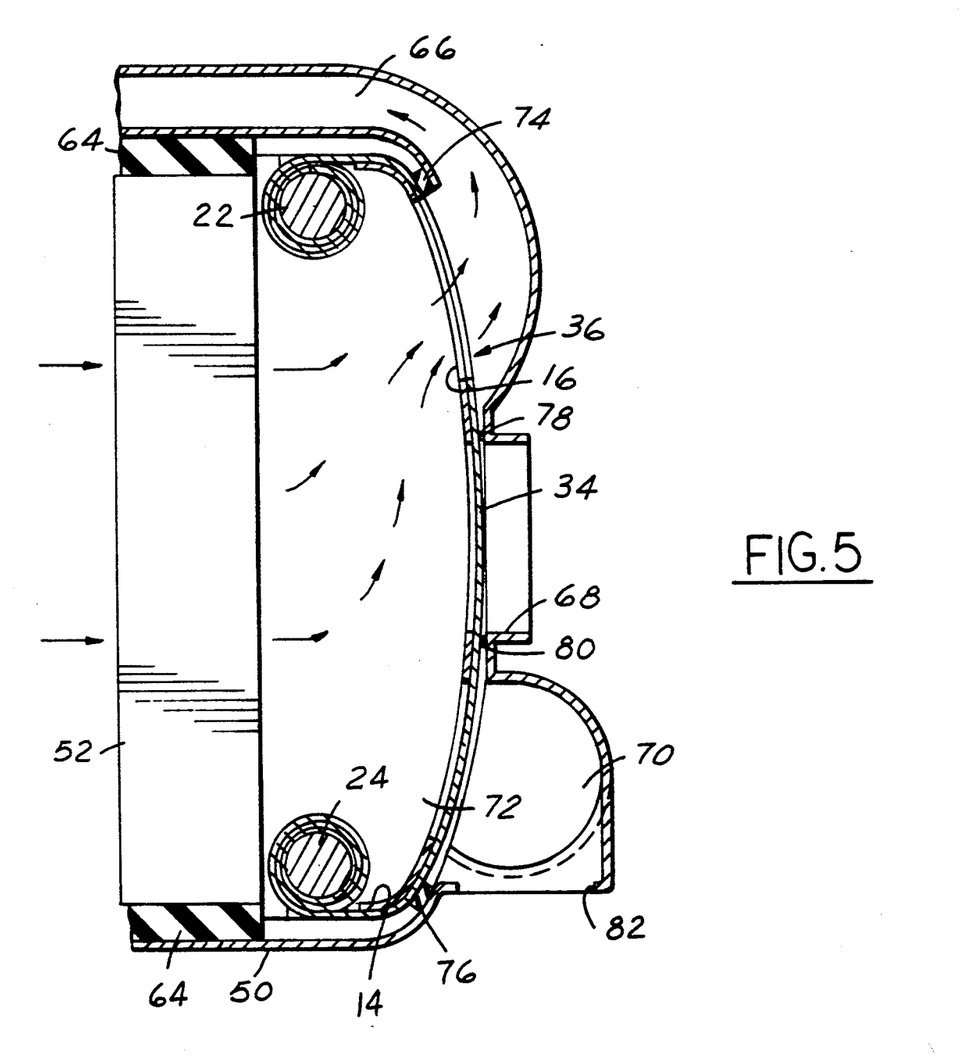
FIG. 5 illustrates a cross-sectional view of the air distribution apparatus taken along line 5—5 of FIG. 4 according to the present invention.

Adjacent the air flow inlet to the film guide frame 14 is a heater core 52 and a seal 64. The seal 64 substantially prevents air flow from leaking around the heater core 52 thereby forcing the air flow through the heater core 52. A chamber 72, seen in FIG. 5, is primarily defined between the heater core 52, the film guide frame 14 and the flexible film 34. Thus this chamber 72 includes an inlet which is basically defined by the outlet surface area of the heater core 52 and also includes a plurality of discharge openings 16, 18 and 20 as described above.

The heater-a/c system 10 includes an outside air inlet 54 and a recirculation inlet 56 for providing air to a blower 58. The preferred blower is described in U.S. Pat. No. 4,900,228 and the description of this blower is incorporated herein by reference. It is also contemplated that other blower wheels can be utilized for the present invention. Air then passes from the blower 58 evenly through an evaporator core 60. A seal 62 is provided between the outer duct housing 50 and the evaporator core 60 to allow substantially all of the air to pass through the evaporator core 60.

Air continues to flow from the evaporator core 60 through the heater core 52. The seal 64 is provided between the heater core 52 and the outer duct housing 50 to prevent air from going around the heater core 52. Air then flows from the heater core 52 into the chamber 72 and continues out at least one of the discharge openings 16, 18, and 20 depending upon the position of the flexible film 34 and the respective location of the cut out region 36 or any other cutout regions which may be provided in the film. The conditioned air is then passed through the outer duct housing 50 to the respective ducts.

The outer duct housing 50 includes a defrost air supply duct 66, a panel air outlet 68 and a floor duct 70. It is to be understood that other associated duct work may be necessary to provide the conditioned air to the final destination in the vehicle. It is also to be understood that the defrost air supply duct 66 takes the air from the discharge opening 16 and passes the air via the duct above the film guide frame 14, the heater core 52 and the evaporator core 60 for allowing a space efficient a/c system. Likewise the floor duct 70 passes the air downwardly from the discharge opening 20 toward the floor openings 82 found in the vehicle dash (not shown).

Figure 3:
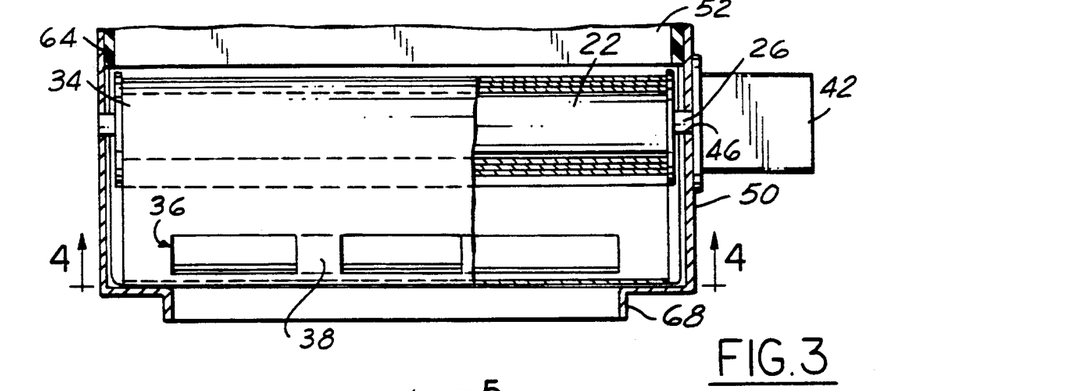
FIG. 3 illustrates a cross-sectional view of the air distribution apparatus taken along line 3—3 in FIG. 1 according to the present invention.

FIG. 3 illustrates a top view, in cross section taken along line 3—3 in FIG. 1 showing the air distribution apparatus according to the present invention. This view clearly shows the connection of the roller 22 through the driving shaft 26 connecting to the bidirectional motor 42. The driving shaft 26 extends through the hole 46 in the outer duct housing 50. The heater core 52 is shown adjacent to the roller 22 and includes a seal 64 separating the heater core 52 from the outer duct housing.

Figure 4:
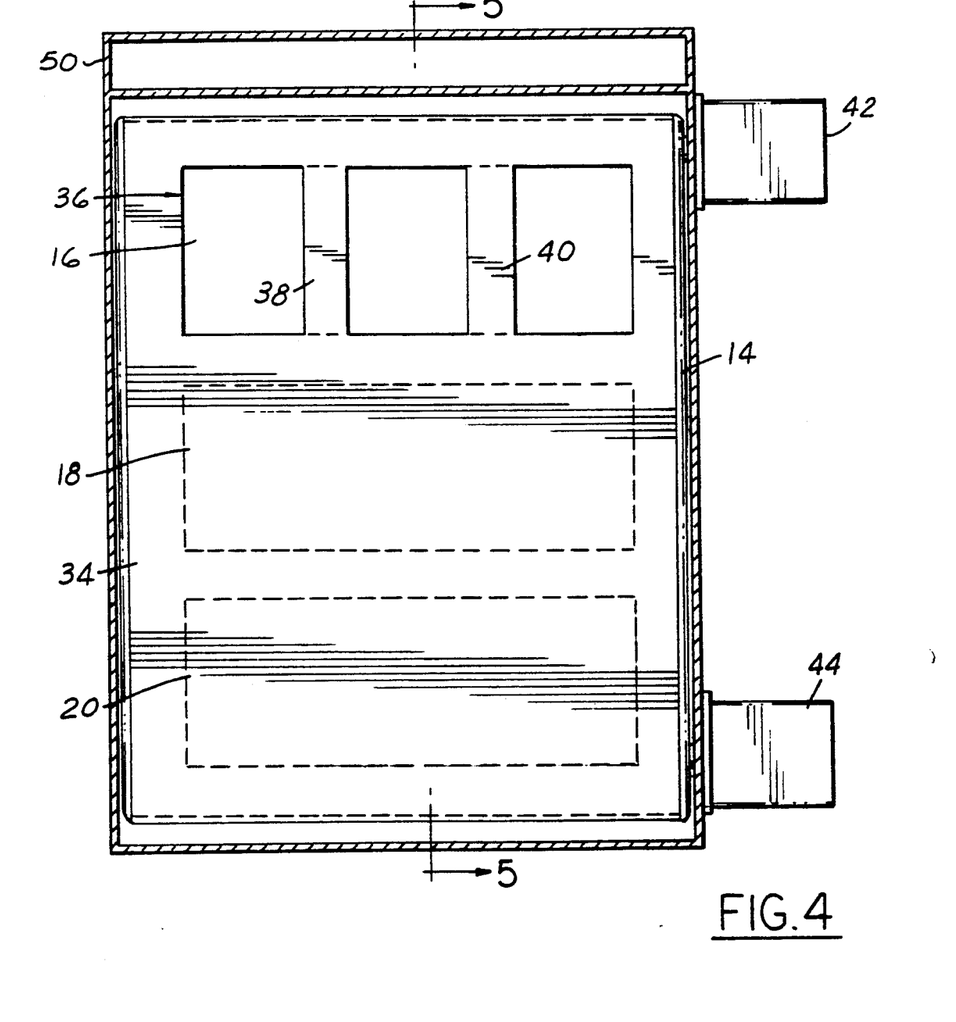
FIG. 4 is a cross-sectional view of the air distribution apparatus taken along line 4—4 of FIG. 3 according to the present invention.

FIG. 4 illustrates the view taken along line 4—4 of FIG. 3. This view shows the cutout region 36 located adjacent to discharge opening 16. It is to be understood that as the driving motors pull the film 34 in a downward fashion, relative to the position shown in FIG. 4, the cutout region 36 can supply air via discharge openings 16 and 18 when the cutout region overlaps those two openings. This arrangement provides air flow to the defrost and panel ducts. Likewise, further movement of the film 34 downward provides air flow only through discharge opening 18. Additional movement of the film 34 will then open up discharge opening 20 for a mix between discharge openings 18 and 20 and then upon further movement, only through discharge opening 20.

If the film 35 utilized in FIG. 2a was utilized, it would be possible to provide air through both the discharge openings 16 and 20. This film 35 with two cutout regions 37 and 39 provides a more versatile arrangement in that less movement of the motors 42 and 44 is necessary to provide the desired outlet combinations with a minimum number of cutouts. As stated earlier, a pattern of cutout regions to obtain flow through all three discharge openings simultaneously would include three cutout regions that would correspond to the discharge openings.

FIG. 5 discloses a cross sectional view of the air distribution apparatus taken along line 5—5 in FIG. 4. This view illustrates the air flow through the air distribution apparatus when the cutout region 36 is located adjacent the discharge opening 16. Air flows through the heater core 52 and is not allowed to bypass the heater core 52 due to the seal 64. The air then continues through the chamber 72 and passes out discharge opening 16 into the defrost air supply duct 66.

Conditioned air is prevented from flowing between the heater core 52 and the rollers 22 and 24 to provide flow to the various ducts because of the use of seals 74 and 76. These seals 74 and 76 effectively prevents any bypass flow between the heater core 52 and the rollers 22 and 24. It is contemplated that these seals 74 and 76 may not be necessary if it is acceptable to tolerate a small amount of leakage between the outer duct housing 50 and the film guide frame 14. If the distance between these members is decreased, the minor amount of leakage that may occur, may be acceptable in some instances.

It is also possible to prevent flow between the defrost air supply duct 66 and the panel air outlet 68 as well as between the panel air outlet 68 and the floor duct 70 by providing seals 78 and 80 between the outer duct housing 50 and the flexible film 34. While seals 74, 76, 78 and 80 will have some frictional effect on the travel of film 34, this effect will not significantly effect the travel of film 34. It is also possible to make these seals smaller such that there is almost point contact on the film. It is also contemplated that by proper dimensioning of the outer duct housing 50 in these regions that these seals can be eliminated.

The outer duct housing 50 includes a condensate drain tube 90 for draining any condensate that is produced. The condensate drain tube 90 is disposed at an angle of approximately 30° for allowing draining even while the car is parked on a hill.

Outer duct housing 50 is provided with floor duct 70 that provides air openings in the bottom thereof such as opening 82 which opens downwardly. The floor duct 70 can also have openings in the sides for convenience of ducting.

The present design allows for the defrost air supply duct to travel back above the heater core 52 and evaporator core 60. The present design also allows many other advantageous features. For example, since the blower utilized in the present invention spreads air evenly over the evaporator core area and likewise over the heater core, and since both the heater core 52 and the evaporator core 60 are controlled by fluid control valves for regulating the fluid into and from the heater core and the evaporator core, it is possible to achieve air stratification. This is possible by providing the inlet of the heater core at the bottom of the heater core shown by inlet tube 84 and the outlet of the heater core at the top as shown by the outlet tube 86. It has been found that it is possible to obtain air stratification using this system. At certain flow rates, hot air coming off the bottom of the heater core 52 will be substantially hotter than the air flow delivered through the top of the heater core. This provides the opportunity to send air flow to the floor of the vehicle which is substantially hotter than the air flow to the defroster outlet. This feature is extremely desirable for passenger comfort. It is to be understood that while this feature has been described with the rolling film valving system, it is also possible to provide standard damper doors with vacuum actuated motors for ducting this stratified air flow.

It is possible for the vehicle climate control system to automatically determine the air temperature differences coming off different portions of the heater core by providing temperature sensors on the downstream face of the heater core for sensing fin temperature or discharge air temperature. These temperature sensors are then fed into a feedback loop which provides a microprocessor (which is programmable by one of ordinary skill in the art) with the temperature readings. Based on these readings, it is possible to actuate the particular fluid flow control valves for regulating the flow to the heater core to achieve the desired discharge air conditions.

The method of positioning the film in a particular position can be accomplished by an number of methods. On method is by using a digital encoder or multi-turn potentiometer coupled to the shaft of the rollers to indicate film position. Other methods include optical methods such as imprinting marks on the edge of the film and sensing these marks. It is also possible to use stepper motors which will allow distinct positions to be obtained.

To maintain film tension on the film, it is preferred that the driving motor is run at 100% of its speed and the trailing motor is duty cycle controlled at less than 100%.

It is also contemplated that the heater core shown in the figures could be replaced with two individual heater cores which are disposed side by side. Then by providing a separating dividing housing down the middle of the air distribution chamber, it is possible to Provide independent temperature control for the right and left sides of the vehicle.

While particular embodiments of the present invention have been illustrated and described, it will be obvious to those skilled in the art that various changes and modifications may be made to the methods of our invention and the products produced thereby without departing from the invention. For example, the control of the film position can also be done by other methods well known to those skilled in the art. The appended claims cover modifications and equivalents as fall within the true spirit and scope of this invention.

What is claimed is:

1. An air distribution apparatus for an automotive vehicle, comprising:
   means, primarily including a heat exchanger, an inner guide frame, and a flexible material, defining a chamber for receiving air conditioned by at least one heat exchanger, said chamber including an inlet opening and a plurality of discharge openings; and
   means, downstream of said inlet opening for selectively allowing air flow through at least one of said discharge openings, said means for selectively allowing air flow comprising:
   a pair of rollers, each roller being disposed adjacent to one of said discharge openings;

said flexible material disposed along a non-planar path between said rollers and having at least one cutout area; and means for bidirectional driving of said rollers for positioning said flexible material such that said cutout area is either positioned for allowing air flow through at least one of said discharge openings or for preventing air flow through any of said discharge openings.

2. An air distribution apparatus as defined in claim 1, wherein said cutout area is substantially equal in size to the size of one of said discharge openings.

3. An air distribution apparatus as defined in claim 1, wherein said means for bidirectional driving of rollers includes an electric motor operatively connected to at least one said roller.

4. An air distribution apparatus as defined in claim 3, wherein said means for bidirectional driving of said rollers includes two electric motors, one motor operatively connected to each said roller.

5. An air distribution apparatus as defined in claim 1, wherein said chamber includes three discharge openings for providing air flow to three separate locations in the vehicle.

6. An air distribution apparatus as defined in claim 5, wherein said flexible material includes three said cutout areas positioned such that air flow is capable of flowing out any one or any combination of discharge openings at a given time.

7. An air distribution apparatus as defined in claim 1, wherein said means for bidirectional driving of said rollers is disposed inside of said chamber.

8. An air distribution apparatus a defined in claim 1, wherein said inner guide frame includes an inner housing, an outer housing, and means for guiding said flexible material therebetween.

9. An air distribution apparatus comprising:

a film guide frame having an inner and outer housing, said inner housing having an inlet opening and a plurality of discharge openings;

a pair of rollers disposed in said film guide frame and each roller being adjacent to one of said discharge openings;

a flexible film disposed along a non-planar path in said film guide frame between said rollers, said film having a plurality of cutout areas such that air flow is selectively capable of flowing out any one or any combination of discharge openings at a given time or for preventing air flow through any of said discharge openings;

means for bidirectional driving of said rollers for positioning said flexible film such that said cutout area is either positioned for allowing air flow through at least one of said discharge openings or for preventing air flow through any of said discharge openings; and a heat exchanger disposed adjacent to the inlet of said inner housing of said film guide frame;

wherein said heat exchanger, said inner housing and said flexible film substantially define a chamber for receiving conditioned air that passes through said heat exchanger.

* * * * *

REEXAMINATION CERTIFICATE (2485th)
United States Patent [19]
Smith

[11] B1 5,105,730
[45] Certificate Issued  Feb. 14, 1995

[54] AIR DISTRIBUTION APPARATUS FOR AN AUTOMOTIVE DEVICE

[75] Inventor: Calvin G. Smith, Dearborn, Mich.

[73] Assignee: Ford Motor Company, Dearborn, Mich.

Reexamination Request:
No. 90/003,174, Aug. 26, 1993

Reexamination Certificate for:
Patent No.: 5,105,730
Issued: Apr. 21, 1992
Appl. No.: 628,965
Filed: Dec. 17, 1990

[51] Int. Cl.⁶ .............................................. B60H 1/14
[52] U.S. Cl. ................... 454/161; 251/901; 454/145

[56] References Cited

FOREIGN PATENT DOCUMENTS 62-80438  4/1987  Japan .
63-180512  7/1988  Japan .
476412  11/1975  U.S.S.R. .

OTHER PUBLICATIONS

Takahiro Tokunaga, "Blowing Port Switching Mechanism of Air Conditioning Device for Use in Vehicle", Journal of Nippondenso Technical Disclosure, Published Feb. 15, 1990, No. 70–025.

*Primary Examiner*—Henry A. Bennett

[57] ABSTRACT

An air distribution apparatus for an automotive vehicle, comprising a chamber for receiving air conditioned by at least one heat exchanger, the chamber includes an inlet opening and a plurality of discharge openings and mechanism downstream of the inlet opening for selecting at least one of the discharge openings. The mechanism for selecting comprises a pair of rollers, a flexible material disposed between the rollers and having at least one cutout area; and a mechanism for bidirectional driving of the rollers for positioning the flexible material such that the cutout area is either positioned for allowing air flow through at least one of the discharge openings or for preventing air flow through any of the discharge openings.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-9 are determined to be patentable as amended.

1. [An air distribution apparatus] *A heating and air conditioning module* for an automotive vehicle, comprising:

means, primarily including a heat exchanger, an inner guide frame, and a flexible material, defining a chamber for receiving air conditioned by at least one heat exchanger, said chamber incuding an inlet opening and a plurality of discharge openings; [and]

*a housing defining an interior volume;*

*a rotary air blower operative to receive the radially inward flow of air from said inlet opening and discharge the air in a direction coaxial with the axis of rotation of said rotary air blower;*

*an evaporator disposed substantially across said housing in a direction substantially normal to the direction of air flow from said air blower for receiving the flow of air therethrough, said evaporator being operative to circulate a quantity of refrigerant therethrough for cooling the air blowing therethrough;*

*said heat exchanger being disposed substantially across said housing in a direction substantially normal to the direction of air flow from said air blower and spaced-apart from the evaporator a predetermined distance for receiving the flow of air therethrough, said heat exchanger being operative to circulate a quantity of refrigerant therethrough for heating the air flowing therethrough;* means, downstream of said inlet opening for selectively [allowing air flow through at least one of said discharge openings, said means for selectively allowing air flow] *distributing the flow of air from the heat exchanger to any one or a combination of discharge openings, said distributing means* comprising:

a pair of *spaced-apart* rollers, each roller being disposed adjacent to one of said discharge openings;

said flexible material disosed along a non-planar path between said rollers and having at least one cutout area; and means for bidirectional driving of said rollers for positioning said flexible material such that said cutout area is either positioned for allowing air flow through at least one of said discharge openings or for preventing air flow through any of said discharge openings.

2. [An air distribution apparatus] *A heating and air conditioning module* as defined in claim 1, wherein said cutout area is substantially equal in size to the size of one of said discharge openings.

3. [An air distribution apparatus] *A heating and air conditioning module* as defined in claim 1, wherein said means for bidirectional driving of rollers includes an electric motor operatively connected to at least one said roller.

4. [An air distribution apparatus] *A heating and air conditioning module* as defined in claim 3, wherein said means for bidirectional driving of said rollers includes two electric motors, one motor operatively connected to each said roller.

5. [An air distribution apparatus] *A heating and air conditioning module* defined in claim 1, wherein said chamber includes three discharge openings for providing air flow to three separate locations in the vehicle.

6. [An air distribution apparatus] *A heating and air conditioning module* as defined in claim 5, wherein said flexible material includes three said cutout areas positioned such that air flow is capable of flowing out any one or any combination of discharge openings at a given time.

7. [An air distribution apparatus] *A heating and air conditioning module* as defined in claim 1, wherein said means for bidirectional driving of said rollers is disposed inside of said chamber.

8. [An air distribution apparatus] *A heating and air conditioning module* as defined in claim 1, wherein said inner guide frame includes an inner housing, an outer housing, and means for guiding said flexible material therebetween.

9. [An air distribution apparatus] *A heating and air conditioning module for an automotive vehicle,* comprising:

*a housing defining an interior volume;*

*a rotary air blower operative to receive a radially inward flow of air and discharge the air in a direction coaxial with the axis of rotation of said rotary air blower;*

*an evaporator disposed substantially across said housing in a direction substantially normal to the direction of air flow from said air blower for receiving the flow of air therethrough, said evaporator being operative to circulate a quantity of refrigerant therethrough for coolng the air flowing therethrough;*

*a heat exchanger disposed substantially across said housing in a direction substantially normal to the direction of air flow from said air blower and spaced-apart from the evaporator a predetermined distance for receiving the flow of air therethrough, said heat exchanger being operative to circulate a quantity of refrigerant therethrough for heating the air flowing therethrough;*

*a film guide frame having an inner and outer housing, said inner housing having an inlet opening and a plurality of discharge openings, said heat exchanger being disposed adjacent to said inlet opening, a pair of rollers disposed in said film guide frame and each roller being adjacent to one of said discharge openings;*

*a flexible film disposed along a non-planar path in said film guide frame between said rollers, said film having a plurality of cutout areas such that air flow is selectively capable of flowing out any one or any combination of discharge openings at a given time or for preventing air flow through any of said discharge openings;*

*means for bidirectional driving of said rollers for positioning said flexible film such that said cutout area is either positioned for allowing air flow* through at least one of said discharge openings or for preventing air flow through any of said discharge openings,; and
[a heat exchanger disposed adjacent to the inlet of said inner housing of said film guide frame;]
wherein said heat exchanger, said inner housing and said flexible film substantially define a chamber for receiving conditioned air that passes through said heat exchanger.

* * * * *